United States Patent [19]

Allen et al.

[11] Patent Number: 4,579,901

[45] Date of Patent: Apr. 1, 1986

[54] MODIFIED POLYPHENYLENE ETHER COMPOSITIONS HAVING IMPROVED FLOW

[75] Inventors: Richard B. Allen, Pittsfield, Mass.; Robert L. Reis, Clifton Park, N.Y.

[73] Assignee: General Electric Company, Selkirk, N.Y.

[21] Appl. No.: 684,878

[22] Filed: Dec. 21, 1984

[51] Int. Cl.[4] ............................................... C08K 5/12
[52] U.S. Cl. .................................. 524/294; 524/314; 524/281
[58] Field of Search ............... 524/294, 288, 314, 577, 524/508, 281; 525/68, 132; 560/103

[56] References Cited

U.S. PATENT DOCUMENTS

| | | | |
|---|---|---|---|
| 4,206,154 | 6/1980 | Lee et al. | 525/132 |
| 4,256,853 | 3/1981 | Naylor et al. | 525/68 |
| 4,504,613 | 3/1985 | Abolins et al. | 524/314 |

FOREIGN PATENT DOCUMENTS 59-108060  6/1984  Japan .

*Primary Examiner*—Veronica P. Hoke

[57] ABSTRACT

Compositions are provided comprising a combination of polyphenylene ether resin or a polyphenylene ether resin modified with an alkenyl aromatic resin and a property improving amount of a low viscosity polyester based plasticizing agent.

15 Claims, No Drawings

MODIFIED POLYPHENYLENE ETHER COMPOSITIONS HAVING IMPROVED FLOW

FIELD OF THE INVENTION

Compositions exhibiting improved flow characteristics upon molding are provided by combining polyphenylene ether resin, alkenyl aromatic resin and a property improving amount of a low viscosity polyester plasticizer.

BACKGROUND

Polyphenylene ether resin compositions are a well-known class of thermoplastics finding a wide range of which are useful for many plastics applications, including molding and extrusion processes.

Polyphenylene ether resins are often combined with styrenic resins, notably high impact polystyrene, to provide a family of products with varying properties. One of the particularly advantageous properties of the polyphenylene ether resins and alloys are their relatively high heat distortion temperatures. Typically, however, the heat distortion temperature of a thermoplastic is inversely related to the degree of flow such thermoplastics exhibit in a molding process. For example, a plastic having a high heat distortion temperature will not typically flow as easily as the same plastic system having a lower heat distortion temperature. As a result, it is often necessary to plasticize the thermoplastic resin in order to achieve the flow characteristics required for a given application.

Prior art plasticizers for polyphenylene ether resin systems include triaryl phosphates such as triphenyl phosphate or tri-isopropylphenyl phosphate. Such plasticizers are generally successful but are not necessarily suitable for all polyphenylene ether resin applications. Such triaryl phosphates are known to decrease the environmental stress crack resistance of the thermoplastic matrix, and in certain applications this is a disadvantageous result.

It was therefore an object of the present invention to find a non-phosphorous based plasticizing agent which showed the requisite plasticizing effect such as improved flow and lower heat distortion temperature while at the same time avoiding some of the deleterious properties of triaryl phosphate plasticizers.

DESCRIPTION OF THE INVENTION

There is provided a thermoplastic composition comprising:
(a) a polyphenylene ether resin, or a polyphenylene ether resin modified with an alkenyl aromatic resin; and
(b) a property improving amount of an aromatic polyester plasticizer of the formula

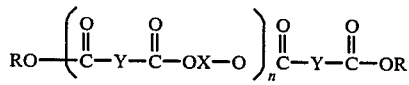

wherein Y is a divalent aryl radical or divalent aliphatic radical having 1 to 25 carbon atoms, X is a divalent hydrocarbon radical having 1 to 25 carbon atoms and is preferably a divalent aliphatic radical having 2 to 8 carbon atoms, R is a monovalent alkyl or aromatic radical having 1 to 15 carbon atoms preferably alkyl or isoalkyl such as for example, isononyl alcohol, iso-octyl alcohol etc., n is an integer of approximately 2 to 20 and preferably 3 to 10 and most preferably 3 to 7, and wherein the ratio of aromatic ester to aliphatic ester is greater than, approximately, 30 percent based on the diacid portion of the compound.

The polyester plasticizer can be obtained as a reaction product of adipic acid and phthalic anhydride. Certain effective plasticizing agents are available commercially such as the ADMEX ® materials available from SHEREX Chemical Company Inc. The relatively low viscosity of the materials described above contribute to the plasticization effect in the thermoplastic polyphenylene ether matrix. Varying degrees of plasticization can be achieved by varying the loadings of the plasticizing agent. Those skilled in the art will readily achieve a proper balance of properties. It is to be noted that as little as 0.5 to 1 part may be effective for wetting a dry thermoplastic blend and thereby improve the dry blend handling and processing characteristics of such materials. As many as 20 parts or more of the plasticizer based on 100 parts of the thermoplastics resin can also be utilized depending upon the degree of plasticization required as well as amount of heat distortion temperature which can be sacrificed for a given application.

The polyphenylene ether resins are well known materials disclosed in many U.S. patents including among others Hay, U.S. Pat. Nos. 3,306,874 and 3,306,875 and Stamatoff U.S. Pat. No. 3,257,357. The polyphenylene ethers are generally prepared by an oxidative coupling reaction comprising passing an oxygen-containing gas through a reaction solution of a phenol and a metal amine complex catalyst.

It is also known that polyphenylene ether resins can be combined with styrenic resins to provide alloys exhibiting properties which possess improved properties compared to the use of the corresponding properties of either resin alone. Such alloys are described by Cizek in U.S. Pat. No. 3,383,435. All of the foregoing U.S. Patents are hereby incorporated by reference.

Such polyphenylene ether resin compositions are often made in flame retarded versions and may utilize, as an example, the triaryl phosphate plasticizing agents above as the flame retarding agent. While it is certainly possible to use such triaryl phosphates in compositions of the present invention, it would appear to be counterproductive but not impossible to combine the triaryl phosphate materials and the low-viscosity polyester plasticizing agent described above. It is believed that the compositions described above will particularly benefit by the utilization of bromine based flame retarding agents which would not ordinarily include the phosphate based materials previously mentioned. Among the conventional flame retarding agents contemplated for use in compositions of the present invention are those disclosed by Fox in U.S. Pat. No. 3,855,277 which is incorporated herein by reference.

Conventional additives such as reinforcing and non-reinforcing fillers, pigments, stabilizers and lubricants can be employed in the practice of the present invention. All of these materials as well as the resinous components may be combined by conventional means such as in a twin screw extruder. Compositions of the present invention can be molded or extruded into useful articles of manufacture by means known to those skilled in the art.

EXAMPLES 1-4

Blends comprising 50:50 mixtures of poly(2,6-dimethyl-1,4-phenylene)ether resin and high impact polystyrene were compounded with varying levels of either a low viscosity polyester plasticizer or a triaryl phosphate plasticizer. Sample parts were molded (melt temperature was 520° F.) and tested in accordance with conventional methods. Results are depicted in Table 1.

ether-high impact polystyrene blends containing different plasticizers.

TABLE 3

| BLEND | PLASTICIZER | PARTS | % CONDENSATE |
|---|---|---|---|
| * | Triaryl phosphate | 10 | 1.25 |
| * | Triaryl phosphate | 20 | 2.50 |
| 11 | Aromatic Polyester | 10 | 0.86 |
| 12 | Aromatic Polyester | 20 | 1.60 |
| * | None | 0 | 0.37 |

*Comparative

TABLE 1

| Example | Plasticizer | Parts[c] | Melt Viscosity @ 540° F. 100 | Melt Viscosity @ 540° F. 1500 | Flow Channel (Inches) | HDT ¼ in. Bar (°F.) | Izod Impact (ft. lb./in. N.) | Flex Yield (psi) | Flex Mod (psi × $10^5$) |
|---|---|---|---|---|---|---|---|---|---|
| 1 | Polyester[a] | 5 | 5309 | 1687 | 10.5 | 216 | 4.5 | 12039 | 3.567 |
| 2 | Polyester[a] | 10 | 4167 | 1315 | 15 | 197 | 4.4 | 11307 | 3.604 |
| 3 | Polyester[a] | 15 | 3494 | 1018 | 17.5 | 184 | 3.3 | 10527 | 3.575 |
| 4 | Polyester[a] | 20 | 2668 | 925 | 21 | 169 | 3.4 | 9302 | 3.268 |
| CONTROL | None | — | 10403 | 2346 | 9 | 239 | 4.4 | 13092 | 3.69 |
| A* | Triaryl Phosphate[b] | 5 | 6077 | 1645 | 12 | 217 | 4.6 | 12398 | 3.64 |
| B* | Triaryl Phosphate[b] | 10 | 5779 | 1329 | 15 | 198 | 4.6 | 11577 | 3.63 |
| C* | Triaryl Phosphate[b] | 15 | 4929 | 1145 | 18 | 172 | 4.5 | 10584 | 3.62 |
| D* | Triaryl Phosphate[b] | 20 | 3056 | 937 | 21 | 162 | 5.3 | 9087 | 3.33 |

*Comparative examples
[a]ADMEX ® 433B polyester plasticizer, available from Sherex Chemical Co., Inc.
[b]KRONITEX ®-50 triaryl phosphate, available from FMC, Inc.
[c]Parts plasticizer per 100 parts base resin

EXAMPLE 5-10

Compatibility of a plasticizer with a thermoplastic matrix can be judged by several different tests. Compatibility is noted when a significant decrease in heat deflection temperature (HDT) occurs with increased plasticizer content. This is generally analogous to measuring the glass transition temperature of the material.

Alternatively, incompatiblity of the system is noted by the occurance of delamination of molded parts.

Table 2 depicts a comparison of blends. Note the decreased compatibility of materials incorporating polyester plasticizers having a ratio of aromatic ester to aliphatic ester less than 30/70.

EXAMPLE 13

Stress crack resistance was evaluated in a 1.5% Strain Jig by measuring time (in minutes) to failure of test parts exposed to cracking agents.

Composition A contained 35 parts poly(2,6-dimethyl-1,4-phenylene)ether (PPE), 65 parts high impact polystyrene (HIPS), 11.7 parts brominated polycarbonate flame retardant (available from Great Lakes Chemical), 7.5 parts ADMEX 433B and 5.0 parts conventional stabilizing additives.

Composition B contained 25 parts PPE, 75 parts

TABLE 2

| Example | Plasticizer Type | Grade | Parts | HDT (°F.) | Change in HDT (−F.°) | Delamination | Ratio Aromatic Ester/ Aliphatic Ester |
|---|---|---|---|---|---|---|---|
|  | Triaryl phosphate | K-50* | 10 | 198 | 36 | NO |  |
|  |  | K-50* | 20 | 162 |  | NO |  |
| 5 | Polyester ADMEX ® | 433B | 10 | 197 | 28 | NO | 100/0 |
| 6 |  | 433B | 20 | 169 |  | NO |  |
| 7 |  | 433B | 5 | 213 | 24 | NO |  |
| 8 |  | 433B | 10 | 189 |  | NO |  |
| 9 | Polyester ADMEX ® | 523 | 5 | 208 | 19 | NO | 100/0 |
| 10 |  | 523 | 10 | 189 |  | NO |  |
|  | Polyester ADMEX ® | 760 | 5 | 233 | 6 | YES | 0/100 |
|  |  | 760 | 10 | 227 |  | YES |  |
|  | Polyester ADMEX ® | 761 | 5 | 219 | 7 | YES | 25/75 |
|  |  | 761 | 10 | 212 |  | NO |  |
|  | Polyester ADMEX ® | 775 | 5 | 228 | 6 | NO | 0/100 |
|  |  | 775 | 10 | 222 |  | YES |  |
|  | Polyester ADMEX ® | 770 | 5 | 222 | 8 | NO | 5/95 |
|  |  | 770 | 10 | 214 |  | NO |  |

*KRONITEX ®-50

EXAMPLES 11 AND 12

Compositions of the present invention utilizing a polyester plasticizing agent having a ratio of aromatic ester to aliphatic ester greater than about 30:70 also exhibit a significant reduction in loss of the aromatic polyester during molding compared to previous plasticizing agents. Table 3 shows the amount of condensate collected after heating a few pellets of polyphenylene HIPS (high gloss type), 11.7 parts brominated polycarbonate flame retardant and 5.0 parts stabilizing additives. Table 4 indicates the results.

TABLE 4

| CRACKING AGENT | FAILURE TIME (MIN.) at 1½% STRAIN COMPOSITION A | B |
|---|---|---|
| Kronitex ®-50 | 29 | 14 |

TABLE 4-continued

| | FAILURE TIME (MIN.) at 1½% STRAIN | |
|---|---|---|
| CRACKING AGENT | COMPOSITION A | B |
| ADMEX ® 433B | <240 | <240 |

We claim:

1. A thermoplastic composition, comprising:
   (a) a polyphenylene ether resin, or a polyphenylene ether resin modified with an alkenyl aromatic resin; and
   (b) a property improving amount of an aromatic polyester plasticizer of the formula

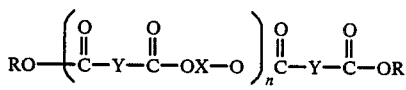

wherein Y is a divalent aryl radical or divalent aliphatic radical having 1 to 25 carbon atoms, X is a divalent hydrocarbon radical having 1 to 25 carbon atoms, R is a monovalent alkyl or aromatic radical having 1 to 15 carbon atoms, n is an integer of approximately 2 to 20, and wherein the ratio of aromatic ester to aliphatic ester is greater than, approximately, 30 percent based on the diacid portion of the compound.

2. A composition as in claim 1 wherein X is a $C_4$ to $C_8$ divalent aliphatic radical.

3. A composition as in claim 1 wherein R is isononyl alcohol.

4. A composition as in claim 1 wherein n is an integer of, approximately, 3 to 7.

5. A composition as in claim 1 wherein said polyphenylene ether resin is a homopolymer or copolymer of phenylene ether, or mixtures thereof.

6. A composition as in claim 5 wherein said polyphenylene ether resin is poly(2,6-dimethyl-1,4-phenylene)ether.

7. A composition as in claim 5 wherein said polyphenylene ether resin is a copolymer comprised of 2,6-dimethyl-1,4-phenylene units and 2,3,6-trimethyl-1,4-phenylene units.

8. A composition as in claim 1 wherein said alkenyl aromatic resin is a styrenic resin.

9. A composition as in claim 1 wherein said alkenyl aromatic resin is rubber modified polystyrene.

10. A composition as in claim 1, further comprising an impact strength improving amount of a rubber compound.

11. A composition as in claim 1, further comprising a flame retarding amount of a flame retardant additive.

12. A composition as in claim 11, wherein said flame retardant additive is a low molecular weight polymer of a carbonate of a halogenated dihydric phenol.

13. A composition as in claim 1 wherein said divalent hydrocarbon radical X is a divalent aliphatic radical having 2 to 8 carbon atoms.

14. A composition as in claim 1 wherein n is an integer of 3 to 10.

15. A composition as in claim 14 wherein n is an integer of 3 to 7.

* * * * *